No. 669,201. Patented Mar. 5, 1901.
J. G. HEHR.
BICYCLE.
(Application filed Sept. 23, 1899.)
(No Model.)

Witnesses
John A. Paulson
E. E. Nielson

John G. Hehr, Inventor
By Schreiter & Mathews
his Att'ys

THE NORRIS PETERS CO., PHOTO-LITHO., WASHINGTON, D. C.

UNITED STATES PATENT OFFICE.

JOHN G. HEHR, OF BROOKLYN, NEW YORK.

BICYCLE.

SPECIFICATION forming part of Letters Patent No. 669,201, dated March 5, 1901.

Application filed September 23, 1899. Serial No. 731,467. (No model.)

*To all whom it may concern:*

Be it known that I, JOHN G. HEHR, of the city of New York, borough of Brooklyn, county of Kings, and State of New York, have invented certain new and useful Improvements in Bicycles, of which the following is a full, clear, and exact specification, reference being had to the accompanying drawings, wherein—

Figure 2:
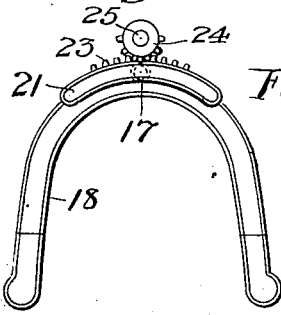
Figure 1:
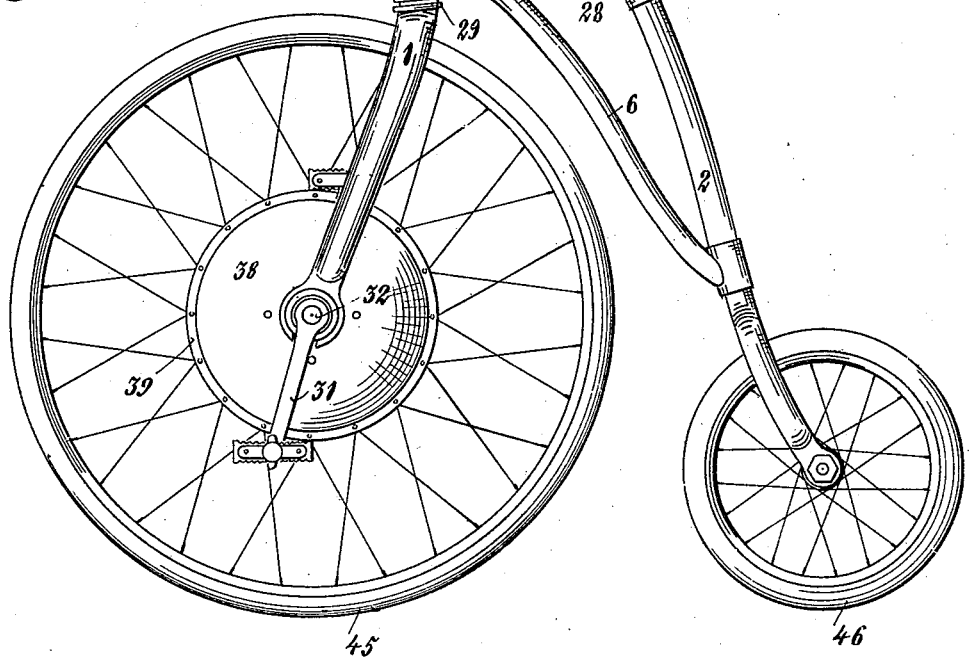

Figure 1 is an elevation of my improved bicycle, and Fig. 2 is an enlarged detail view of the handle-bar and steering-post.

Similar numerals of reference indicate corresponding parts in both views of the drawings.

My invention relates to vehicles adapted to be propelled by pedaling of the rider; and it consists of the hereinafter-described improvements in the construction of such vehicles.

The construction of my improved vehicle is described with reference to a bicycle, as shown in the drawings. The same is, however, applicable to tricycles and other similar vehicles, requiring only such slight modification in the construction of the frame as the number and arrangement of the wheels may require.

The frame of the bicycle consists of forks 1 and 2, posts 3 and 4, and braces 5 and 6. The stem of fork 1 is snugly fitted in sleeve 7, resting on flange 8, and is held therein by head 9. Braces 5 and 6 are welded or soldered to sleeve 7, to the stem of fork 2, and to post 3, respectively, as shown in the drawings. Post 4 is integral with sleeve 10, which is welded or soldered to brace 5 and is joined by brace 11 to brace 5.

Post 3 is mounted by means of sleeve 12 on the stem of fork 2 and supported by brace 5, which is integral with sleeve 13. The handle-bar post 17 is set in post 3, and handle-bar 18 is adjustably secured thereto. The handle-bar is supported by braces 19, integral with or secured to ring 20, which is snugly fitted upon post 3, and the collar 20ª serving as bearing for same.

Post 4 is hollow, and saddle-post 14 is snugly fitted therein. Saddle-post 14 is adjustable with reference to post 4 and is secured in position by set-screw 15. Saddle 16 is adjustably mounted thereon and secured thereto in the usual manner. Handle-bar 18 is shaped in the form of a back-rest for the rider, and its termini are elongated to form supports for the elbows and the arms of the rider.

Back-rest 21, corresponding in shape with the handle-bar 18, is set upon it and connected thereto by posts 22. If my improved vehicle is built in the form of a bicycle, as shown in the drawings, there is only one wheel in each of the forks 1 and 2. Of these the front wheel serves as a driving and steering wheel, while both wheels support equally the weight of the vehicle and of the body of the rider.

If the vehicle is built in the form of a tricycle, two wheels are placed in the rear, as is usually done in tricycles, and then fork 2 is mounted on their common axle.

The steering of the vehicle is accomplished by the handle-bar through the following mechanism: A rack 23 is affixed to the apex of the handle-bar 18 and engages with pinion 24, rigidly secured to post 25. This post is mounted in bearings 26, secured by set-screws to post 3, and on its lower end is mounted a sprocket or rope wheel 27. A chain or rope 28 is stretched over this sprocket or rope wheel 27 and sprocket or rope flange 29, provided on the stem of fork 1. This chain or rope 28 is preferably crossed to bring the turns of the wheel in agreement with the turns of the handle-bar.

The vehicle is propelled by the pedaling of the rider, whose feet work on pedals 31, operating the propelling-gear arranged in connection with axle 32 and within the spokes of the front wheel.

I claim as my invention and desire to secure by Letters Patent—

1. A vehicle comprising a frame composed of two forks joined together by braces as herein shown and described and of two posts, a saddle-post and a back post, joined to the forks and to the braces; wheels rotatably mounted in bearings set in the ends of the forks, a back-rest set movably on the back post and provided with extensions for supporting the arms of the rider; a rack affixed to the back-rest, a spindle set parallel to the back post and journaled in bearings affixed thereto; a pinion set on the upper end of the spindle and engaging with the rack, a sprocket-wheel set on the lower end of the spindle, a sprocket-flange set on the stem of the forward fork, a chain stretched over the sprocket-wheel and the sprocket-flange of the fork-stem; a driving-wheel set in the forward fork and means for propelling the vehicle mounted on the axle of the driving-wheel.

2. A vehicle comprising a frame composed of two forks joined together by braces as herein shown and described and of two posts, a saddle-post and a back post, joined to the forks and to the braces; wheels rotatably mounted in bearings set in the ends of the forks, a back-rest set movably on the back post and provided with extensions for supporting the arms of the rider, means for transmitting the motion of the back-rest to the stem of the forward fork; a driving-wheel set in the forward fork and means for propelling the vehicle mounted on the axle of the driving-wheel.

JOHN G. HEHR.

Witnesses:
  JOHN A. PAULSON,
  C. C. NIELSON.